US011361072B2

(12) United States Patent
Mandal

(10) Patent No.: US 11,361,072 B2
(45) Date of Patent: Jun. 14, 2022

(54) RUNTIME DETECTION OF BROWSER EXPLOITS VIA INJECTED SCRIPTS

(71) Applicant: McAfee, LLC, San Jose, CA (US)

(72) Inventor: Debasish Mandal, Bangalore (IN)

(73) Assignee: McAfee, LLC, San Jose, CA (US)

( * ) Notice: Subject to any disclaimer, the term of this patent is extended or adjusted under 35 U.S.C. 154(b) by 124 days.

(21) Appl. No.: 16/587,806

(22) Filed: Sep. 30, 2019

(65) Prior Publication Data

US 2021/0097174 A1    Apr. 1, 2021

(51) Int. Cl.
*G06F 21/55* (2013.01)
*G06F 21/54* (2013.01)

(52) U.S. Cl.
CPC .......... *G06F 21/554* (2013.01); *G06F 21/54* (2013.01); *G06F 2221/033* (2013.01); *G06F 2221/2119* (2013.01)

(58) Field of Classification Search
CPC .......... G06F 21/554; G06F 2221/2119; G06F 21/54; G06F 2221/033
See application file for complete search history.

(56) References Cited

U.S. PATENT DOCUMENTS

| 10,033,747 | B1 * | 7/2018 | Paithane | G06F 21/554 |
| 10,079,854 | B1 * | 9/2018 | Scott | H04L 63/0281 |
| 2007/0113282 | A1 * | 5/2007 | Ross | G06F 21/52 726/25 |
| 2016/0359875 | A1 * | 12/2016 | Kim | G06F 21/566 |
| 2019/0180036 | A1 * | 6/2019 | Shukla | G06F 11/3604 |

OTHER PUBLICATIONS

K. Ravi Kishore • M. Mallesh • G. Jyostna • P. R. L. Eswari • Samavedam Satyanadha Sarma; Browser JS Guard: Detects and defends against Malicious JavaScript injection based drive by download attacks; The Fifth International Conference on the Applications of Digital Information and Web TechnologieS; (Year: 2014).*
Blanc, G. • Ando, R. • Kadobayashi, Y.; Term-Rewriting Deobfuscation for Static Client-Side Scripting Malware Detection; 2011 4th IFIP International Conference on New Technologies, Mobility and Security (pp. 1-6); (Year: 2011).*
Sachin, V. • Chiplunkar, N.N.; SurfGuard JavaScript instrumentation-based defense against Drive-by downloads; 2012 International Conference on Recent Advances in Computing and Software Systems (pp. 267-272); (Year: 2012).*
Mandal, Debasish, "Browser Exploits? Gram 'em by the Collar!" McAfee Presentation at Haching for B33R, Brucon.org, 68 pages.

* cited by examiner

*Primary Examiner* — Luu T Pham
*Assistant Examiner* — Chao Wang
(74) *Attorney, Agent, or Firm* — Patent Capital Group

(57) ABSTRACT

A computing apparatus, including: a processor and a memory; a web browser; and a web exploit mitigation engine, including instructions within the memory to instruct the processor to: insert a script into an incoming webpage, the script including instructions to hook application programming interface (API) function calls of a scripting language, the API function calls for a plurality of functions commonly used by browser exploits; observe information passed by a running script to the plurality of API functions; correlate the called API functions to a malware model; detect a web page making the API function calls as containing a browser exploit according to the correlating; and act on the detecting.

18 Claims, 14 Drawing Sheets

Response from http://192.168.223.133:80/exploit.html

[Forward] [Drop] [Intercept is on] [Action]

[Raw] [Headers] [Hex] [HTML] [Render]

```
HTTP/1.1 200 OK
Date: Fri, 17 Jun 2016 07:39:10 GMT
Server: Apache/2.2.22 (Debian)
Last-Modified: Wed, 15 Jun 2016 05:54:10 GMT
ETag: "3c5-4303-5354ac092bebb"
Accept-Ranges: bytes
Content-Length: 17736
Keep-Alive: timeout=5, max=100
Connection: Keep-Alive
Content-Type: text/html <html>
<head>
<script src="http://192.168.223.133/108.js""></script></script>
```

```
var rop1 = unescape(
"%u25dc%u51be" + // 0x51be25dc, # POP EDI # RETN [hxds.dll]
"%ucccc%ucccc" + //
"%u1158%u51bd" + // 0x51bd1158, # ptr to &VirtualProtect() [IAT hxds.dll]
"%u098e%u51c3" + // 0x51c3098e, # MOV EAX,DWORD PTR DS:[EDI] # RETN [hxds.dll]
```

Fig. 5

```
<html>
<head>
</head>
<body>
<script language="JavaScript" type="text/javascript">
real_func_inst = alert;
alert = function( arg ) {
    // do what whatever with arg.
    real_func_inst(arg); // Now calling the real alert func.
}
alert( 'hello world' );
</script>
</body>
```

| Name | Date modified | Type | Size |
|---|---|---|---|
| background.js | 12/6/2013 9:17 PM | JavaScript File | 1 KB |
| content-script.js | 12/6/2013 9:17 PM | JavaScript File | 3 KB |
| icon.png | 12/6/2013 9:17 PM | PNG File | 6 KB |
| manifest.json | 12/6/2013 9:17 PM | JSON File | 1 KB |
| popup.html | 12/6/2013 9:17 PM | Chrome HTML Do... | 1 KB |

*Fig. 8*

```
{
  "name": "Browser Exploit Detection System (BIDS)",
  "version": "0.1",
  "manifest_version": 2,
  "description": "Browser Exploit Detection System (BIDS) - McAfee",
  "browser_action": {"default_icon": "icon.png", "default_popup": "popup.html"},
  "icon": {"40": "icon.png"},
  "content_scripts": [
    {
      "matches": ["*://*/*"],
      "js": ["content-script.js"]
    }
  ],
  "permissions": ["tabs", "*://*/*", "notifications"],
  "background": {
    "scripts": ["background.js"],
    "persistent": true
  }
}
```

Fig. 9

```
chrome.extension.onRequest.addListener(function(request, sender, sendResponse) {
    if (request.method == "showNotification")
    {
        var notification = webkitNotifications.createNotification('https://...
        request.key);
        notification.show();
        setTimeout(function(){notification.cancel();}, 5000);
    }
});
```

*Fig. 10*

RUNTIME DETECTION OF BROWSER EXPLOITS VIA INJECTED SCRIPTS

FIELD OF THE SPECIFICATION

This application relates in general to computer security, and more particularly, though not exclusively, to a system and method for providing runtime detection of browser exploits via injected scripts.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

FIG. 5 is a screenshot illustrating an example scenario where JavaScript code reference is injected into a legitimate page by an example browser exploit detection engine.

FIG. 6 is a screenshot of an example JavaScript code that hooks the built-in function "alert," which is also a function commonly used by malware authors.

FIG. 7 illustrates an embodiment in which shellcode uses the unescape function and passes to it, as a parameter, a long string.

FIG. 8 is a screenshot illustrating the injection of JavaScript into a webpage via a browser extension.

FIG. 9 is a screenshot illustrating permissions required from a user.

FIG. 10 is a screenshot of selected aspects of "background.js," illustrating the use of a listener function to notify the user on certain events.

SUMMARY

Figure 1:
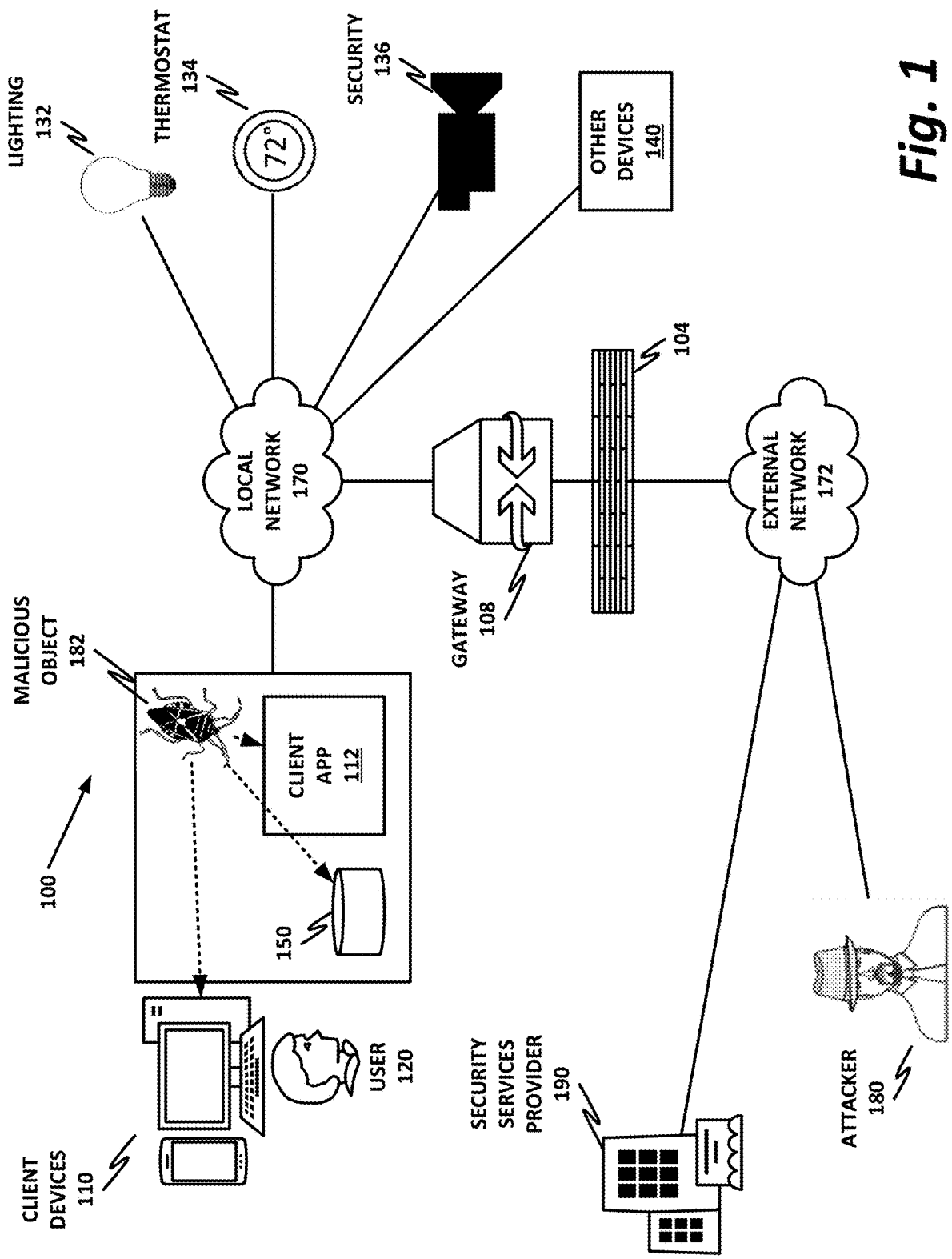
FIG. 1 is a block diagram of selected elements of a security ecosystem.

In an example, there is a computing apparatus, comprising: a processor and a memory; a web browser; and a web exploit mitigation engine, comprising instructions within the memory to instruct the processor to: insert a script into an incoming webpage, the script including instructions to hook application programming interface (API) function calls of a scripting language, the API function calls for a plurality of functions commonly used by browser exploits; observe information passed by a running script to the plurality of API functions; correlate the called API functions to a malware model; detect a web page making the API function calls as containing a browser exploit according to the correlating; and act on the detecting.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Advanced persistent threats (APTs) are currently a topic of great interest among security researchers. APTs are exploits or attacks that install themselves on endpoints within an enterprise, and then try to keep a low profile. This "low profile" makes it difficult for security experts within the enterprise to identify the APT. Thus, the APT may be able to continue doing malicious work for some time before it is detected and mitigated. Rather than being generic viruses or attacks that target whatever machine they happen to encounter, APTs may be highly customized, and targeted at the specific enterprise.

In one recent example, an APT targeted a large, nationwide retailer with a substantial online presence. The APT was able to run on the retailer's endpoints for approximately three weeks before it was detected. For that three-week period, the APT collected an unknown volume of confidential user data, such as credit card numbers, usernames, passwords, and other. When the APT was finally discovered, enterprise endpoints were inspected and scrubbed to ensure that there was no continued contamination. But because the APT was able to hide itself for some time before it was detected, it was able to do a substantial amount of damage before it was detected.

Web browsers on enterprise endpoints are increasingly becoming victims of APT attacks. The attack surface of these web browsers increases every day, as new features are introduced to improve the browsing experience. A common problem for intrusion prevention software vendors is detecting and blocking browser-based exploits in this dynamic environment. Browser-based exploits can be written and obfuscated in many different ways.

Some existing security solutions provide two different methods for detecting and blocking browser exploits. The first is a signature-based detection system. This system encounters limitations because of the dynamic nature of browser-based exploits. A second mechanism is a host-based intrusion prevention system. This may run, for example, as a security agent on the endpoint device. Such a host-based intrusion prevention system may generically block browser exploits by hooking into different Windows APIs used commonly for malicious purposes. However, host-based intrusion prevention systems also encounter limitations. For example, host intrusion prevention systems may seriously affect the client system's performance if they are not designed appropriately.

It is desirable to perform generic detection of browser exploits, with or without an agent installed in the client system, while providing minimal impact on the end user's browsing experience.

Embodiments of the present specification detect and block browser exploits reliably using a JavaScript injection technique and pure JavaScript hooking. In various embodiments, the detection system may be installed at the corporate gateway, or at endpoints as browser extensions. In either case, because the detection system uses pure JavaScript hooking, it has lower to minimal impact on the user's browsing experience.

In an example, instead of looking for malicious tokens in a Hypertext Transfer Protocol (HTTP) response body, the detection system injects a tiny piece of JavaScript code into the HTTP response. When the injected JavaScript code and the actual JavaScript code reach the client's browsers, the code hooks into or overrides several JavaScript APIs that are commonly used by browser exploit writers. Once the actual code of the page executes, the code injected by the detection system logs different JavaScript execution behaviors occurring within the instance of the page. Once behaviors are logged, they can be correlated to behavioral models to determine whether a particular page includes an exploit, or not.

When a client (e.g., a web browser) requests a page to the server, the server responds with the requested page. To detect whether an exploit is being delivered to the client's browser, a normal instruction detection system (IDS) or intrusion prevention system (IPS) signature-based network monitoring solution intercepts the HTTP response body in a corporate gateway, and looks for known malicious patterns in the HTTP response body.

Other solutions also exist, and may work differently. For example, instead of matching known malicious patterns in a server response, the detection system may inject a piece of JavaScript code into the HTTP response body. Once the response page plus the injected code reaches the client's browser, the injected JavaScript code hooks a few built-in JavaScript APIs that are commonly used by exploit developers (e.g., unescape( ), escape( ), and similar). These APIs are commonly used by malware to perform exploitation, obfuscation, preparation of memory layout, etc. An exploit detection engine of the present specification may continually monitor these commonly used JavaScript APIs. Once the hooked JavaScript APIs are called from the actual JavaScript code of the page, the injected hooking JavaScript code intercepts the arguments passed and logs different execution behaviors of that instance of the webpage.

The injected code may also keep track of all the JavaScript events logged in that instance of the page. Once a number of events occurring on a page are logged, a detection logic may try to correlate the behavior with malicious intent. In some examples, known and existing algorithms may be used to make a conclusion. Once the browser exploit detection engine has determined that a page contains a malicious exploit, it may take appropriate action, such as blocking the page, notifying the user, notifying a security administrator, quarantining the web browser, or performing some other security action.

Using the browser exploit detection engine of the present specification, a browser exploit may be detected in a generic and reliable manner with or without the aid of operating system API hooking.

Browser exploits are, by nature, dynamic. One exploit can be written or obfuscated in many ways. Thus, the browser exploit detection engine of the present specification does not rely solely on signature-based detection to identify exploits based on known signatures or tokens.

The browser exploit detection engine may also provide in-browser script execution, behavior logging, and correlation. Behavior correlation provides a beneficial mechanism for identifying malicious code, even if it has been obfuscated. Furthermore, the decision of blocking or allowing a webpage need not be based on a single behavior. The decision may be based on correlating several execution behaviors seen in a webpage, with known patterns of execution behavior, for malicious activity. This correlation of a plurality of behaviors provides reliability to the detection mechanism.

In at least some embodiments, no injection or system API hooking is required. Specifically, in agentless embodiments, no agent is required on the endpoint. In some embodiments, injection of JavaScript code is performed at a gateway. In other embodiments, a browser extension is installed on enterprise endpoints, and the browser extension inserts the JavaScript code on the fly. Each of these approaches has different advantages and disadvantages.

The browser exploit detection engine of the present specification improves endpoint and network monitoring device performance. Advantageously, the detection mechanism does not need to scan every HTTP response page and look for malicious tokens. Rather, it simply injects a small piece of JavaScript code into each webpage. That small piece of JavaScript code then provides the appropriate JavaScript hooks. The web exploit detection engine of the present specification also improves endpoint performance, because at least some embodiments do not require operating system API hooking.

Furthermore, the web exploit detection engine described herein can be provided in a platform independent manner. The core exploit detection logic may be written in and based on JavaScript. Thus, the solution provided can be completely platform independent, as long as the platform supports JavaScript. Because most modern operating systems support JavaScript, the web exploit detection engine of the present specification can be employed on virtually any device.

The web exploit detection engine of the present specification is effective, in part, because many browser-based exploits are written mainly in JavaScript. When any JavaScript browser exploit code runs in the browser, it generally goes through a number of well-defined stages. For example, an example exploit may:

1. Deobfuscate itself, in the case that the exploit is obfuscated.
2. Prepare the desired memory layout for exploitation, for example, by spraying the heap with malicious code such as shellcode, a return-oriented program (ROP) chain, or similar.
3. Trigger required browser vulnerabilities.
4. Transfer the program control flow to the malicious code. The malicious code is already placed in the desired memory location at step 2.

The web exploit detection engine of the present specification realizes advantages because it is more generic than signature-based detection systems. Signature-based detection mechanisms may detect only individual flavors, or instances, of an exploit. However, the web exploit detection engine of the present specification can be designed to recognize generic, exploit-like behavior. It can then detect any web exploit exhibiting that behavior.

To provide this generic web exploit detection mechanism, it may be necessary to place the desired code into the client's system. Some existing, host-based intrusion prevention systems do this by hooking into different Windows APIs used commonly for malicious purposes. However, at least some embodiments of the present specification provide an advantageous approach, that is both simple and reliable, for detecting browser-based exploits without the need of a separate, host-based intrusion prevention system. In other words, in some embodiments, it is not necessary to provide a traditional security agent on the endpoint device to enable the web exploit detection engine. Instead, the JavaScript can be injected by an enterprise gateway, or by a browser extension on the endpoint device, as appropriate to the embodiment.

This solution is leaner than many existing systems. In some existing systems, the client communicates with a remote server, and issues HTTP GET requests to get webpages. A monitoring device may then be placed at an intermediate position (such as within an enterprise gateway or within a service function chain). The monitoring device monitors each incoming webpage and scans it for malicious code or tokens.

On the other hand, embodiments of the present specification do not rely on such an outside monitoring device. Rather, the appropriate JavaScript code can be injected directly into each and every webpage, without additional monitoring activity required by the gateway or service chain. When the page arrives at the endpoint device and the JavaScript is executed by the browser, the injected JavaScript code inserts hooks into JavaScript functions that are commonly used for malware purposes.

Stated otherwise, when any client such as a web browser requests a page to a server, the server responds with the requested page. To detect whether an exploit is being delivered to the client's browser, a traditional IDS or IPS system may intercept the HTTP response body in the corporate gateway and look for known malicious patterns in the HTTP response body.

In contrast, a browser exploit detection engine of the present specification does not necessarily need to match malicious patterns in the server response. Rather, the detection engine injects a tiny piece of JavaScript code into the HTTP response body page. The JavaScript code can be injected at either of the following stages:
  At the corporate gateway. The detection system can inject code into the webpage at a corporate gateway by intercepting HTTP responses.
  At the endpoint using a browser extension. The detection system can inject the JavaScript code into a webpage using a browser extension. This is a very common practice used by malicious browser extensions, and the same practice can be adapted to provide greater browser security. The browser extension may have been installed at any previous time, such as with a batch of security software.

The JavaScript code, injected either by the corporate gateway or by the browser extension, is injected so that when the JavaScript is delivered to the user's browser, the injected JavaScript code is executed first. This is done, for example, by injecting the browser exploit security engine JavaScript code at the top of the page.

A system and method for providing runtime detection of browser exploits via injected scripts will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 may be a standalone internet appliance. Such embodiments are popular in cases in which ecosystem 100 includes a home or small business.

In other cases, gateway 108 may run as a virtual machine or in another virtualized manner. In larger enterprises that features service function chaining (SFC) or network function virtualization (NFV), gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Malicious object 182 could be a browser exploit, such as one providing an APT. Attacker 180 could author malicious object 182 not as a generic malicious object, but rather as an APT that specifically targets the enterprise. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
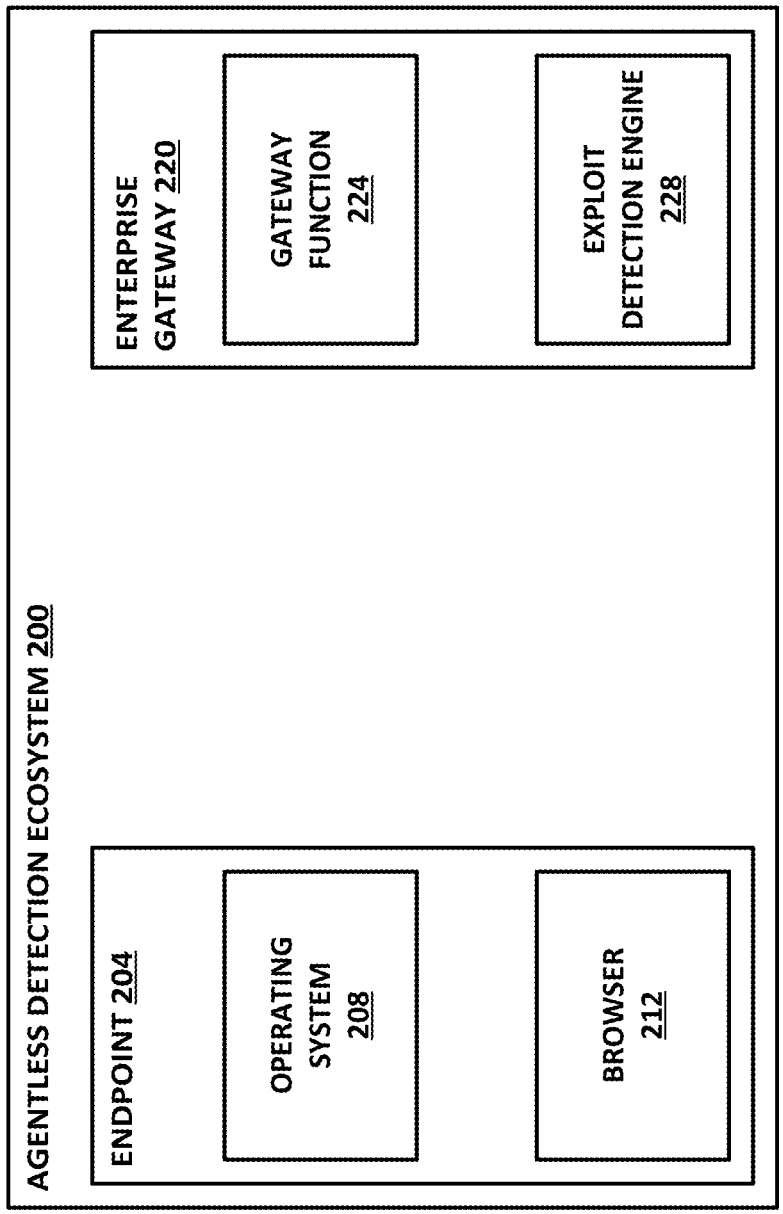
FIG. 2 is a block diagram of an agentless detection ecosystem.

FIG. 2 is a block diagram of an agentless detection ecosystem 200. Agentless detection ecosystem 200 includes an endpoint 204 in communication with an enterprise gateway 220. Endpoint 204 provides an operating system 208, and a browser 212. Browser 212 may be a browser that is capable of executing JavaScript. Thus, a common attack on browser 212 may include the use of a malicious JavaScript.

Enterprise gateway 220 includes a standard gateway function 224, which may be provided as a standalone gateway function, or as part of a service function chain or NFV ecosystem.

Enterprise gateway 220 also includes an exploit detection engine 228.

Exploit detection engine 228 need not necessarily scan each incoming HTTP request page for known malicious tokens, patterns, and/or hashes. Rather, in one embodiment, exploit detection engine 228 simply injects into each HTTP response page a small piece of simple JavaScript code. In some embodiments, this JavaScript code is injected at or near the top of the HTTP response page, to ensure that it is executed before other JavaScript code. This injected JavaScript code may hook certain JavaScript APIs that are commonly used by malicious actors to perform malicious work.

Figure 3:
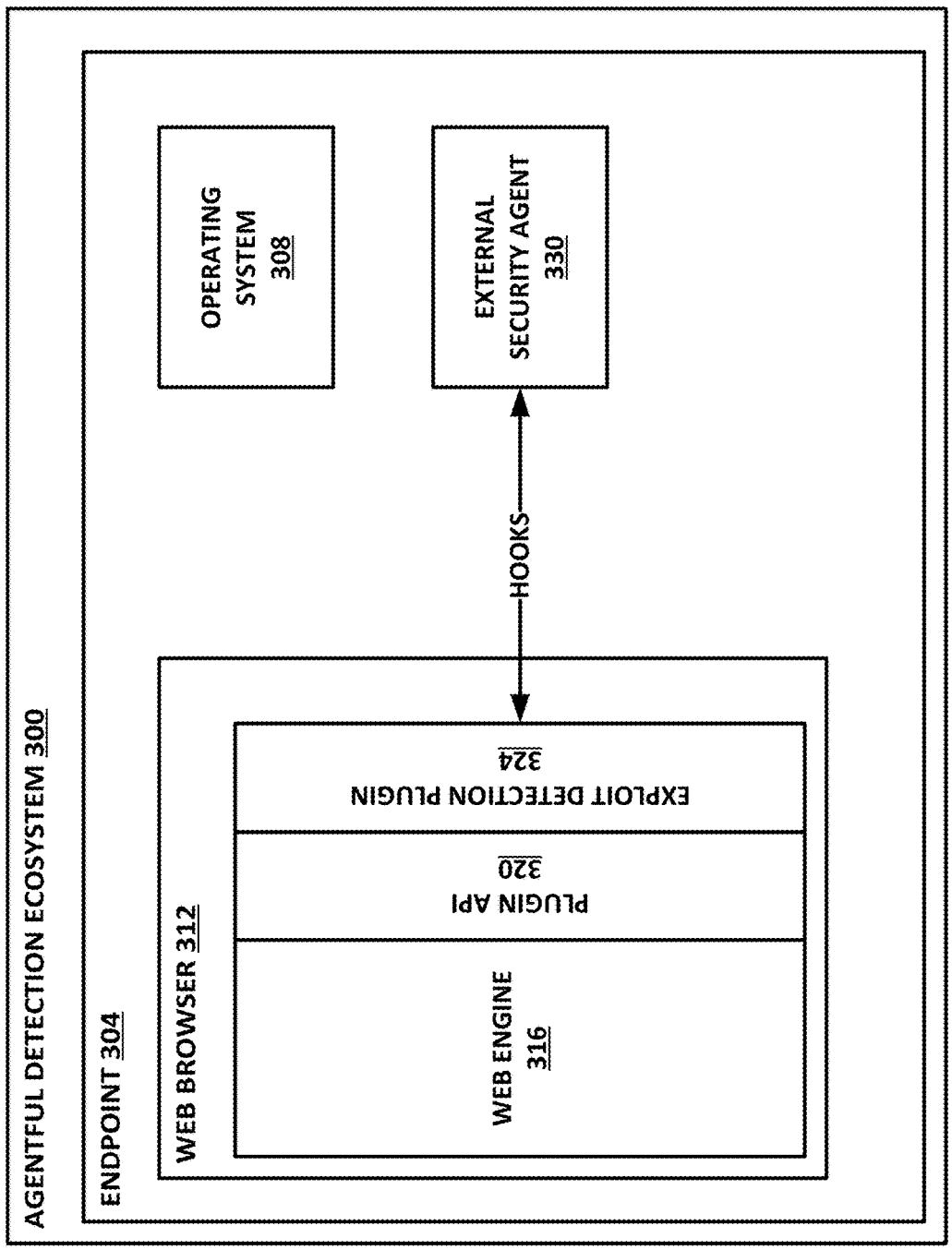
FIG. 3 is a block diagram of an agentful detection ecosystem.

FIG. 3 is a block diagram of an agentful detection ecosystem 300. Agentful detection ecosystem 300 need not rely on an enterprise gateway, such as enterprise gateway 220 of FIG. 2. The agentful detection ecosystem 300 may realize advantages, such as by providing detection of malicious activity, even when the endpoint device is not connected to the enterprise gateway. For example, if the end user is traveling and takes the endpoint device with him, and connects to a non-enterprise network in a hotel, agentful detection ecosystem 300 still provides the end user with protection against browser exploits.

Agentful detection ecosystem 300 includes an endpoint device 304. Endpoint device 304 includes an operating system 308, a web browser 312, and optionally, an external security agent 330.

Under some pre-existing security solutions, external security agent 330 would insert operating system hooks into operating system 308. These operating system hooks would be inserted into API calls that are commonly used by malware authors. However, the insertion of these API hooks can substantially slow down web browser 312, and thus may substantially affect the end user's experience.

In at least some embodiments, rather than insert API hooks into operating system 308, web browser 312 includes a standard web engine 316. Examples of web engines include, by way of illustrative and nonlimiting example, WebKit, Blink, Chromium, Gecko, Trident, and others.

Web engine 316 includes a plugin API 320 that allows the use of plug-ins with web browser 312. An exploit detection plugin 324 connects with web engine 316 via plugin API 320. Exploit detection plugin 324 may insert a simple JavaScript script into each webpage viewed within web browser 312. The JavaScript script may in some cases be injected at or near the top of the webpage to ensure that it executes before other JavaScript code.

In an embodiment, the JavaScript script hooks certain JavaScript APIs that are commonly used for malicious activity. This hooking of JavaScript APIs is generally more lightweight than hooking directly into operating system APIs of operating system 308.

Exploit detection plugin 324 may also include a behavioral model by which it can observe the behavior of a particular webpage with respect to the hooked APIs. The exploit detection plugin 324 may then compare the behavior of the webpage to the behavioral model, to determine whether the webpage is exhibiting malicious behavior.

In some embodiments, exploit detection plugin 324 may communicate via hooks with an external security agent 330. Note that this is optional, and in some embodiments, the detection logic is provided directly within exploit detection plugin 324. However, in some embodiments, more heavyweight processing or substantial modeling may be required. In those cases, exploit detection plugin 324 may communicate with external security agent 330, via hooks, interprocess messaging, or other mechanisms. External security agent 330 may also communicate with an enterprise security ecosystem, which may include, for example, global or enterprise threat intelligence, global signatures, and other information.

Figure 4:
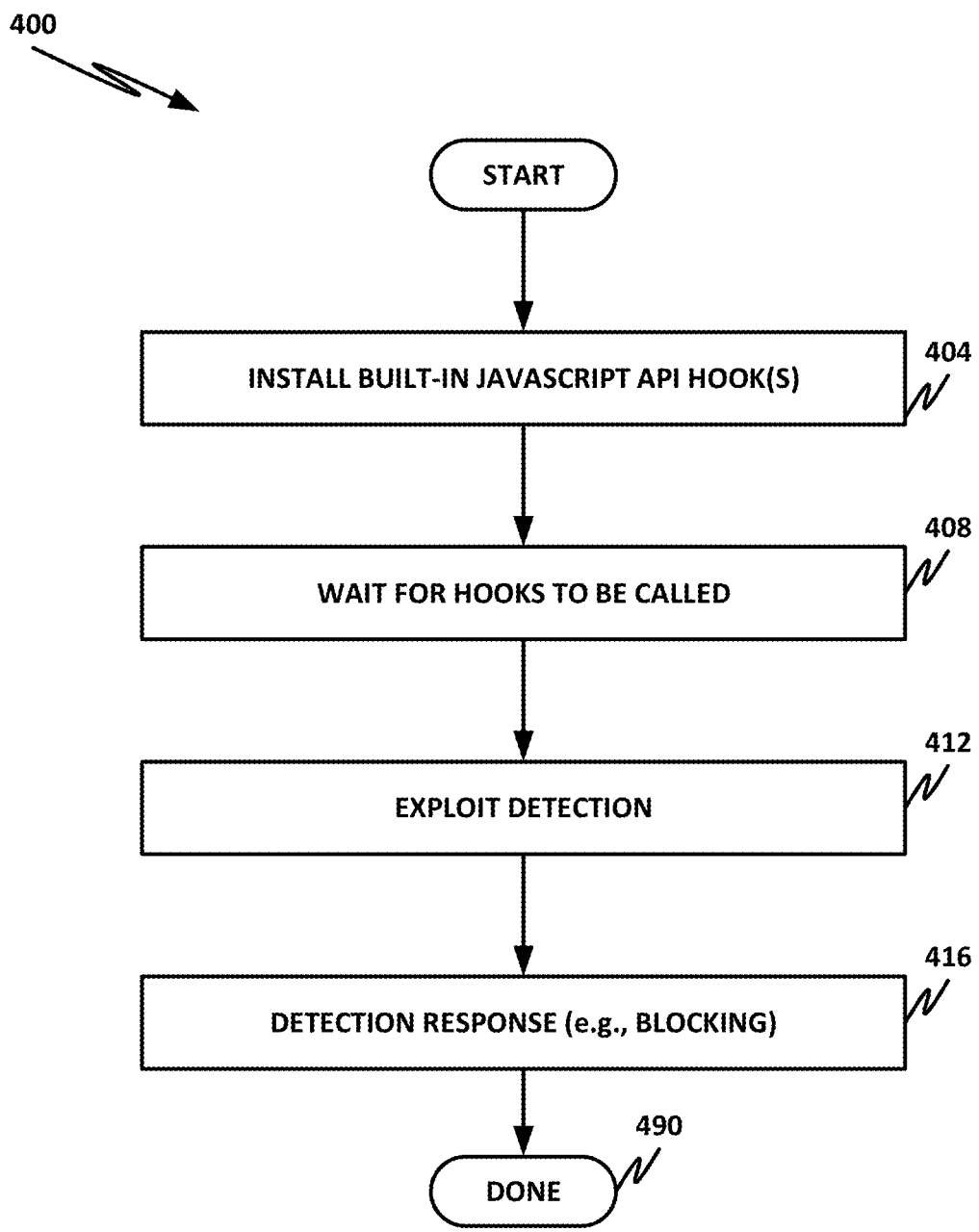
FIG. 4 is a flowchart of a method of performing browser exploit mitigation.

FIG. 4 is a flowchart of a method 400 of performing browser exploit mitigation. The method of FIG. 4 may be performed, for example, by a web exploit detection engine, such as exploit detection plugin 324 of FIG. 3, or via JavaScript injected by exploit detection engine 224 of FIG. 2.

Starting at block 404, the exploit detection engine installs built-in JavaScript API hooks. This may be done, for example, by installing the JavaScript code at the top or near the top of the webpage, to ensure that the API calls are hooked in other JavaScript code.

In block 408, the exploit detection engine waits for those hooks to be called. When one of the hooks is called, the operation is intercepted, and processing may be performed before the information is then passed on to the standard JavaScript implementation of the called function.

In block 412, the web exploit detection engine performs exploit detection. This may include, for example, observing the behavior of the hooked API calls, and in some examples, logging that behavior. When the behavior of the API calls is hooked and logged, it can then be compared to known malware models. For example, the logged actions may be compared to a standard malware model that performs standard malware processes such as deobfuscation, preparing the memory layout, triggering the browser vulnerability, and transferring program control. If one or more of these behaviors is observed, then the executing JavaScript code may be detected as malicious.

In block 416, if a script or extension is detected as being malicious, then an appropriate response may be taken. For example, the script or extension may be blocked, the end user may be notified, an enterprise security administrator may be notified, or other action may be taken.

In block 490, the method is done.

FIG. 5 is a screenshot illustrating an example scenario where JavaScript code reference is injected into a legitimate page by an example browser exploit detection engine. Specifically, at or near the top of the page, a very small JavaScript line of code is injected. This script instructs the browser to load the JavaScript source code from an external location, in this case "http://192.168.223.133/ids.js." Once this script is loaded, it hooks the appropriate JavaScript API calls to ensure that detection is performed.

As the script runs, it may detect malicious code, such as the code illustrated here, which represents, for example, an ROP exploit using the "unescape" command. Because the script injected into the webpage hooks the unescape API, the unescape operation can be intercepted, inspected, and logged to determine whether it represents malicious activity.

Once the injected page is delivered to the client's browser, it includes a reference to a web exploit mitigation engine. The web exploit mitigation engine may then perform a method, such as method 400 of FIG. 4.

The injected JavaScript code may hook into a number of JavaScript APIs that are commonly used by exploit developers. For example, unescape, escape, and similar are often used to perform exploitation, obfuscation, preparation of memory layout, and other malicious activity.

FIG. 6 is a screenshot of an example JavaScript code that hooks the built-in function "alert," which is also a function commonly used by malware authors. In this example, the function alert is hooked, and the browser exploit detection engine can do whatever it needs to do with the parameter "arg." Once it has done what it needs to do with the parameter "arg," it can now call the real function instance with the same argument.

Once the JavaScript hooks are installed in the client's browser, whenever those APIs are called from the actual page, the argument can be intercepted. In one embodiment, the browser exploit detection engine tries to detect and block any browser exploit by Stage 2 of the exploitation life cycle. This is the stage in which the exploit prepares the desired memory layout for exploitation by spraying the heap with malicious code, such as shellcode, an ROP chain, or similar.

A close examination of this stage reveals that the shellcode and other malicious content may be supplied using simple JavaScript variables as strings.

Figure 7:
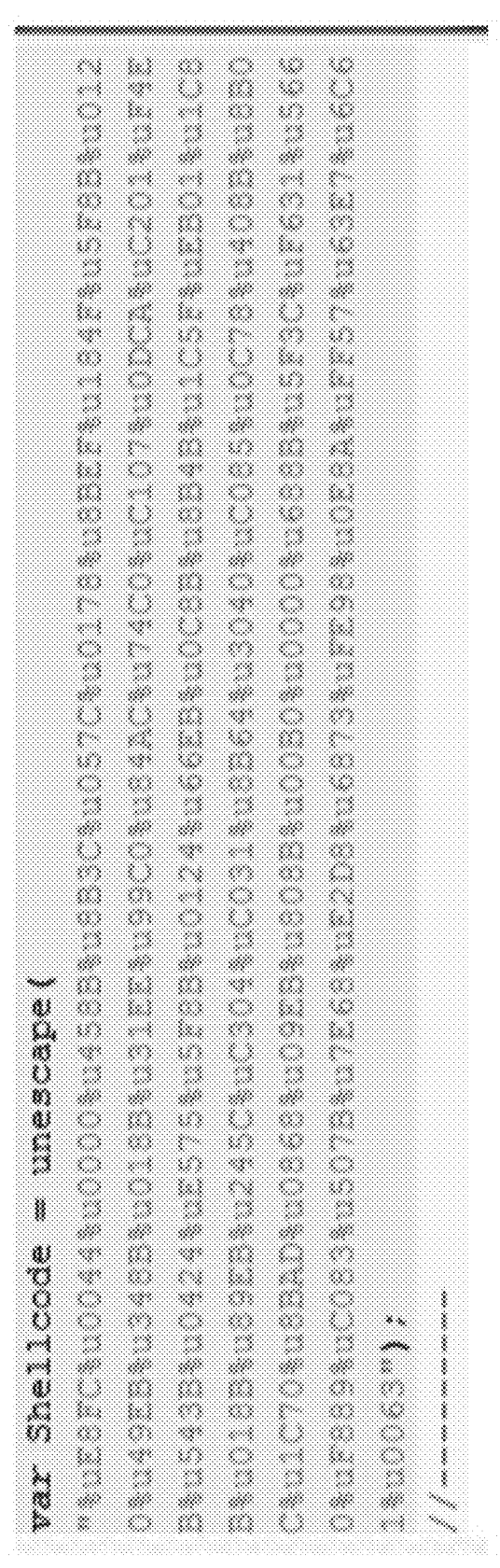

This is illustrated in FIG. 7, where shellcode uses the unescape function and passes to it, as a parameter, a long string. This long string is part of a browser exploit where malicious shellcode is defined as a JavaScript string variable.

When the exploit places malicious code in the desired memory location, the variables are passed to various built-in JavaScript functions that are commonly used for browser exploits. Because the browser exploit detection engine intercepts arguments of these well-known, built-in JavaScript functions, the engine can inspect whether the content of those variables is malicious or not.

Note that, in at least some embodiments of the browser exploit detection engine, there is no need for dynamic link library (DLL) injection or code injection into the browser process. Thus, in at least some embodiments, no external agent is required in the client's system to provide the browser exploit detection. Thus, in at least some embodiments, the browser exploit detection engine may be considered "agentless." It may be completely agentless, such as in the example where the JavaScript code is injected in the enterprise gateway, or it may have a very lightweight agent such as a simple browser plugin.

At least some embodiments of the browser exploit detection engine may be provided in browser script execution behavior logging, behavior correlation, and exploit detection.

For example, once the APIs are called from the actual JavaScript code of the page, the injected hooking JavaScript code intercepts the arguments passed. The hooking API code may then perform several checks to verify whether the arguments are malicious in nature, or not. For example, in an illustrative embodiment, the following behaviors are detected as possibly malicious:

Shellcode detection within JavaScript variable
Memory spray detection
ROP chain detection
Detect creation of element dynamically
Detect use of ActiveX object
Aggressive use of array-related functions for memory layout preparation In at least some embodiments, the detection logic itself may be fully written and implemented in JavaScript. In at least some examples, the detection of the exploit is performed at Stage 2 of the exploitation life cycle (prepare desired memory layout for exploitation) in runtime. At this stage, the exploit code has already deobfuscated itself. Thus, the engine is capable of detecting a class of obfuscated browser exploits, as well.

In contrast, signature-based browser exploit detection systems may fail, with respect to detection of obfuscated browser exploits. In practice, it is observed that nearly 100% of exploits found in the wild and used in targeted attacks are highly obfuscated. However, the injected web exploit detection engine in JavaScript code tries to log different JavaScript execution behaviors of that instance of the webpage. Thus, the injected engine may still be able to identify exploits even when they are obfuscated.

The injected code may also keep track of all of the JavaScript behaviors logged in that instance of the page. Once various events have occurred on the page and have been logged, the detection logic may try to correlate different behaviors using predefined algorithms to determine if it should allow the page or block the page. The decision can be based, for example, on detecting shellcode, memory spray, ROP behavior, and other behaviors.

In some embodiments, if the injected code finds anything malicious, it first grabs all the page contents (both HTML and JavaScript) and uses HTML POST to post them to a separate logging server. The separate logging server can verify whether the detection is a false positive or a real exploit. For example, the separate logging server may be provided by an enterprise server such as enterprise gateway 220 of FIG. 2, or by a virtualized network function providing a security server within the enterprise. Furthermore, the external server could be operated by a security services provider such as security services provider 190 of FIG. 1.

On the local end, once the content is logged, if the webpage is at least suspicious then the web exploit detection engine may immediately stop the page and prevent it from further loading. There are several ways that a page can be stopped. In one embodiment, the JavaScript command window.location="about:blank" is used to flush the page content.

FIGS. 8, 9, and 10 illustrate additional details with respect to an embodiment where a plugin is used, instead of an enterprise gateway to inject the desired JavaScript code.

FIG. 8 is a screenshot illustrating the injection of JavaScript into a webpage via a browser extension. In this illustrative embodiment, the desired JavaScript code is injected via a Google Chrome plugin. The files "background.js," "content-script.js," "icon.png," "manifest.json," and "popup.html" provide the necessary files for the JavaScript plugin.

FIG. 9 is a screenshot illustrating permissions required from a user. In this illustration, content-script.js is injected into every page and includes the JavaScript hooking code and detection logic. The file "background.js" holds the privilege code, and is used to send notifications to the user when an intrusion is detected.

FIG. 10 is a screenshot of selected aspects of "background.js," illustrating the use of a listener function to notify the user on certain events.

In various embodiments, behavioral correlation may be used to assign an overall score to the webpage to determine whether it is malicious. In some embodiments, the use of certain techniques may be assigned to an individual score, and then an overall score for the page can be computed as an aggregate score or a sum of the individual scores. The score can then be compared to a threshold, and if the score exceeds the threshold, then detection may be triggered.

In one illustrative embodiment, the following individual behaviors are assigned the following scores:

TABLE 1

Behavioral Correlation

| Behavior | Score |
| --- | --- |
| Shell Code Detection within JS Variable | 5 |
| Memory Spray Detection | 7 |
| ROP Chain Detection | 10 |
| Detect Creation of Element Dynamically | 2 |
| Detect Use of ActiveXObject( ) | 8 |
| Aggressive use of Array( ) related function for memory layout preparation | 10 |

The behaviors can then be correlated within the browser context by maintaining a behavior-to-core mapping table. When JavaScript within any page executes, the detection system encounters different behaviors and adds the score for each of these behaviors. It also maintains a threshold, and at any point, if the overall score exceeds the threshold, the page is blocked for example by flushing the content.

In an embodiment, the following APIs were identified as commonly used APIs for malware exploits. These include:

TABLE 2

Hooked Build-In JavaScript APIs escape( )
unescape( )
document.write( ),
document.createlement
( ), etc.
string.indexOf(x)
str.lastIndexOf(
slice(start, end)
substring(start, end)
substr(start, length)
concat(
charAt(position)
charCodeAt(position)
ActiveXObject
Array( )

| | |
| --- | --- |
| concat( ) | Merge two or more arrays, and returns a new array. |
| copyWithin( ) | Copies part of an array to another location in the same array and returns it. |
| fill( ) | Fill the elements in an array with a static value. |
| filter( ) | Creates a new array with all elements that pass the test in a testing function. |
| find( ) | Returns the value of the first element in an array that pass the test in a testing function. |
| forEach( ) | Calls a function once for each array element. |
| indexOf( ) | Search the array for an element and returns its first index. |
| isArray( ) | Determines whether the passed value is an array. |
| join( ) | Joins all elements of an array into a string. |
| lastIndexOf( ) | Search the array for an element, starting at the end, and returns its last index. |
| map( ) | Creates a new array with the results of calling a function for each array element. |
| pop( ) | Removes the last element from an array, and returns that element. |
| push( ) | Adds one or more elements to the end of an array, and returns the array's new length. |
| reduceRight( ) | Reduce the values of an array to a single value (from right-to-left). |
| slice( ) | Selects a part of an array, and returns the new array. |
| splice( ) | Adds/Removes elements from an array. |
| toString( ) | Converts an array to a string, and returns the result. |
| values( ) | Returns an Array Iteration Object, containing the values of the original array. |

In at least some embodiments, the detection system does not need to inject the JavaScript code into every single page it encounters. In some embodiments, the system may maintain a predefined, dynamic list of trusted sites. When a trusted site is encountered, the detection JavaScript code need not be injected into that site.

Figure 11:
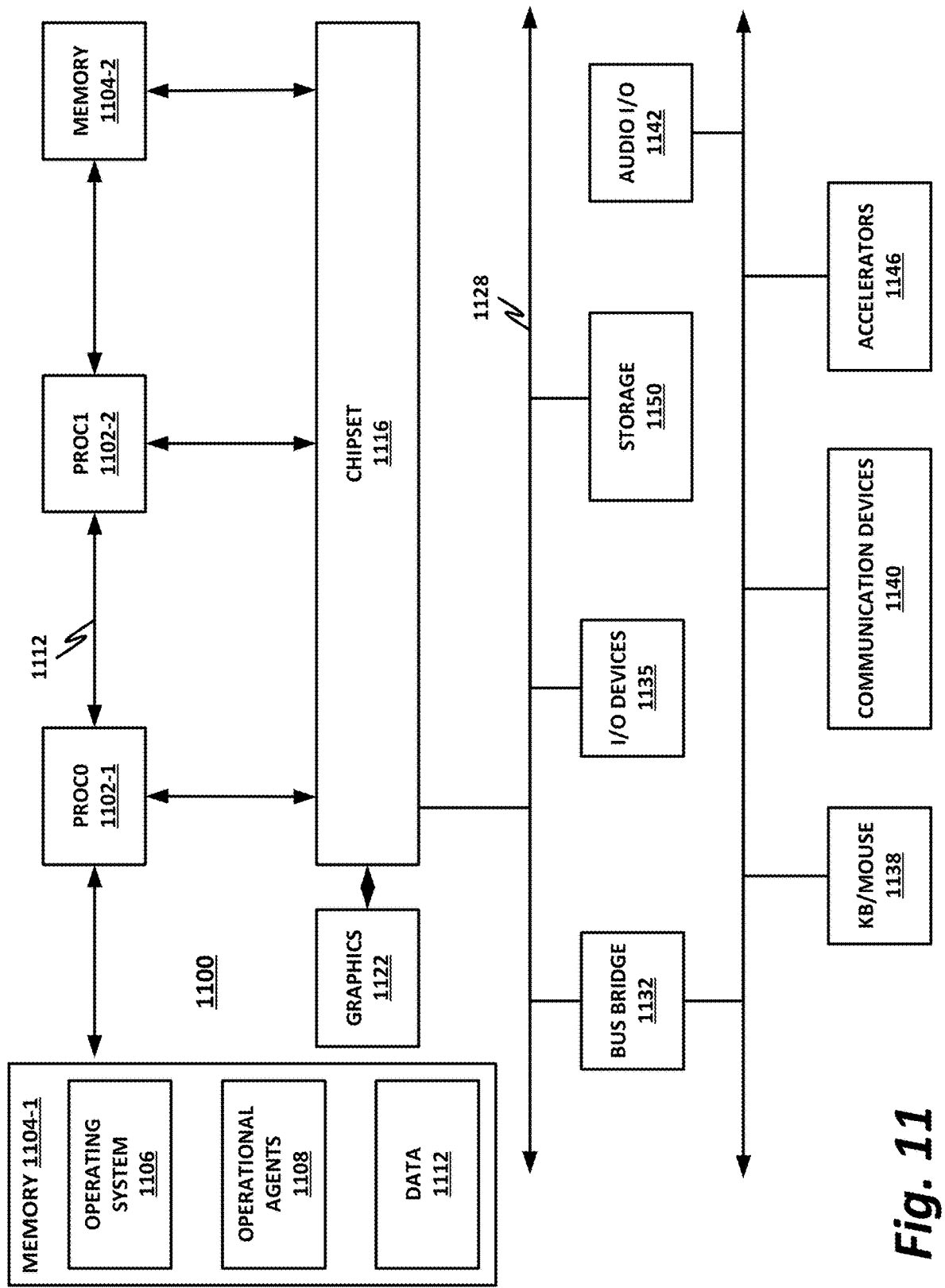
FIG. 11 is a block diagram of selected elements of a hardware platform.

FIG. 11 is a block diagram of a hardware platform 1100. Embodiments of hardware platform 1100 may be configured or adapted for providing runtime detection of browser exploits via injected scripts, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 1100, even though they may be scattered across a data center, or even located in different data centers.

Hardware platform 1100 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 1100 is arranged in a point-to-point (PtP) configuration. This PtP configuration is popular for personal computer (PC) and server-type devices, although it is not so limited, and any other bus type may be used.

Hardware platform 1100 is an example of a platform that may be used to implement embodiments of the teachings of this specification. For example, instructions could be stored in storage 1150. Instructions could also be transmitted to the hardware platform in an ethereal form, such as via network interface 1148, or retrieved from another source via any suitable interconnect. Once received (from any source), the instructions may be loaded into memory 1104, and may then be executed by one or more processor 1102 to provide elements such as an operating system 1106, operational agents 1108, or data 1112.

Figure 13:
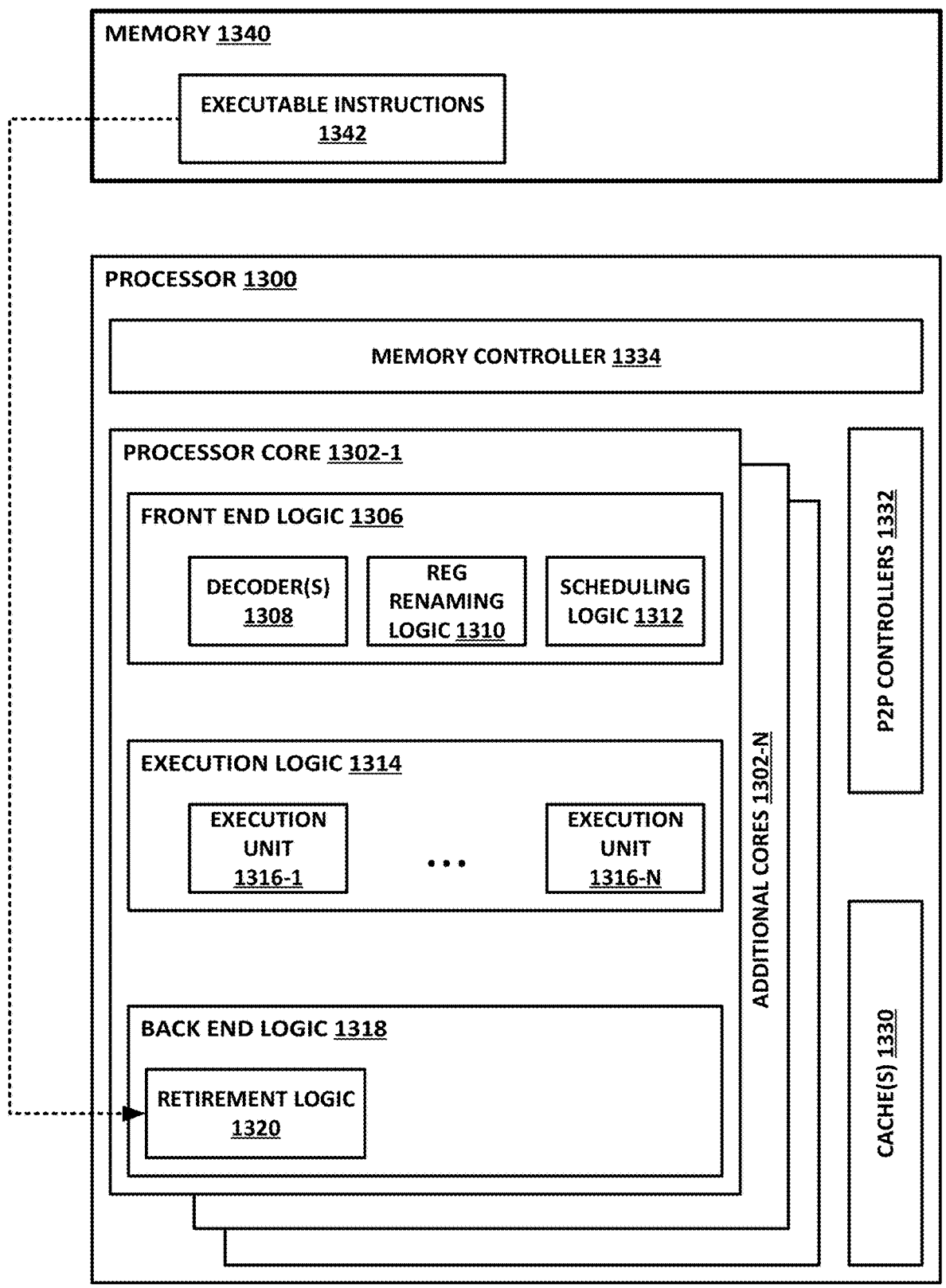
FIG. 13 is a block diagram of selected elements of a processor.

Hardware platform 1100 may include several processors 1102. For simplicity and clarity, only processors PROC0 1102-1 and PROC1 1102-2 are shown. Additional processors (such as 2, 4, 8, 16, 24, 32, 64, or 128 processors) may be provided as necessary, while in other embodiments, only one processor may be provided. Details of processors 1102 are not illustrated in this FIGURE, but one embodiment is illustrated in FIG. 13. Processors may have any number of cores, such as 1, 2, 4, 8, 16, 24, 32, 64, or 128 cores.

Processors 1102 may be any type of processor and may communicatively couple to chipset 1116 via, for example, PtP interfaces. Chipset 1116 may also exchange data with other elements, such as a high performance graphics adapter 1122. In alternative embodiments, any or all of the PtP links illustrated in FIG. 11 could be implemented as any type of bus, or other configuration rather than a PtP link. In various embodiments, chipset 1116 may reside on the same die or package as a central processor unit (CPU) 1102 or on one or more different dies or packages. Each chipset may support any suitable number of CPUs 1102. A chipset 1116 (which may be a chipset, uncore, Northbridge, Southbridge, or other suitable logic and circuitry) may also include one or more controllers to couple other components to one or more CPUs.

Two memories, 1104-1 and 1104-2 are shown, connected to PROC0 1102-1 and PROC1 1102-2, respectively. As an example, each processor is shown connected to its memory in a direct memory access (DMA) configuration, though other memory architectures are possible, including ones in which memory 1104 communicates with processor 1110 via a bus. For example, some memories may be connected via a system bus, or in a data center, memory may be accessible in a remote DMA (RDMA) configuration.

Memory 1104 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 1104 may be used for short, medium, and/or long-term storage. Memory 1104 may store any suitable data or information utilized by platform logic. In some embodiments, memory 1104 may also comprise storage for instructions that may be executed by the cores of CPUs 1102 or other processing elements (e.g., logic resident on chipsets 1116) to provide functionality.

In certain embodiments, memory 1104 may comprise a relatively low-latency volatile main memory, while storage 1150 may comprise a relatively higher-latency nonvolatile memory. However, memory 1104 and storage 1150 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 1104 and storage 1150, for example, in a single physical memory device, and in other cases, memory 1104 and/or storage 1150 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 1122 may be configured to provide a human-readable visual output, such as a command-line interface (CLI) or graphical desktop such as Microsoft Windows, Apple OSX desktop, or a Unix/Linux X Window System-based desktop. Graphics adapter 1122 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 1122 may include a hardware graphics card, which may have its own memory and its own graphics processing unit (GPU).

Chipset 1116 may be in communication with a bus 1128 via an interface circuit. Bus 1128 may have one or more devices that communicate over it, such as a bus bridge 1132, I/O devices 1135, network interface 1148, accelerators 1146, communication devices 1140, and a keyboard and/or mouse 1138, by way of nonlimiting example. In general terms, the elements of hardware platform 1100 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 1140 can broadly include any communication not covered by network interface 1148 and the various I/O devices described herein. This may include, for example, various universal serial bus (USB), FireWire, Lightning, or other serial or parallel devices that provide communications.

I/O Devices 1135 may be configured to interface with any auxiliary device that connects to hardware platform 1100 but that is not necessarily a part of the core architecture of hardware platform 1100. A peripheral may be operable to provide extended functionality to hardware platform 1100, and may or may not be wholly dependent on hardware platform 1100. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 1142 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 1132 may be in communication with other devices such as a keyboard/mouse 1138 (or other input devices such as a touch screen, trackball, etc.), communication devices 1140 (such as modems, network interface devices, peripheral interfaces such as PCI or PCIe, or other types of communication devices that may communicate through a network), audio I/O devices 1142, a data storage device 1144, and/or accelerators 1146. In alternative embodiments, any portions of the bus architectures could be implemented with one or more PtP links.

Operating system 1106 may be, for example, Microsoft Windows, Linux, UNIX, Mac OS X, iOS, MS-DOS, or an embedded or real-time operating system (including embedded or real-time flavors of the foregoing). In some embodiments, a hardware platform 1100 may function as a host platform for one or more guest systems that invoke application (e.g., operational agents 1108).

Operational agents 1108 may include one or more computing engines that may include one or more non-transitory computer-readable mediums having stored thereon executable instructions operable to instruct a processor to provide operational functions. At an appropriate time, such as upon booting hardware platform 1100 or upon a command from operating system 1106 or a user or security administrator, processor 1102 may retrieve a copy of the operational agent (or software portions thereof) from storage 1150 and load it into memory 1104. Processor 1110 may then iteratively execute the instructions of operational agents 1108 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic input/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 1148 may be provided to communicatively couple hardware platform 1100 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 1148 may include one or more physical ports that may couple to a cable (e.g., an Ethernet cable, other cable, or waveguide).

In some cases, some or all of the components of hardware platform 1100 may be virtualized, in particular the processor(s) and memory. For example, a virtualized environment may run on OS 1106, or OS 1106 could be replaced with a hypervisor or virtual machine manager. In this configuration, a virtual machine running on hardware platform 1100 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 11 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 12. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 12:
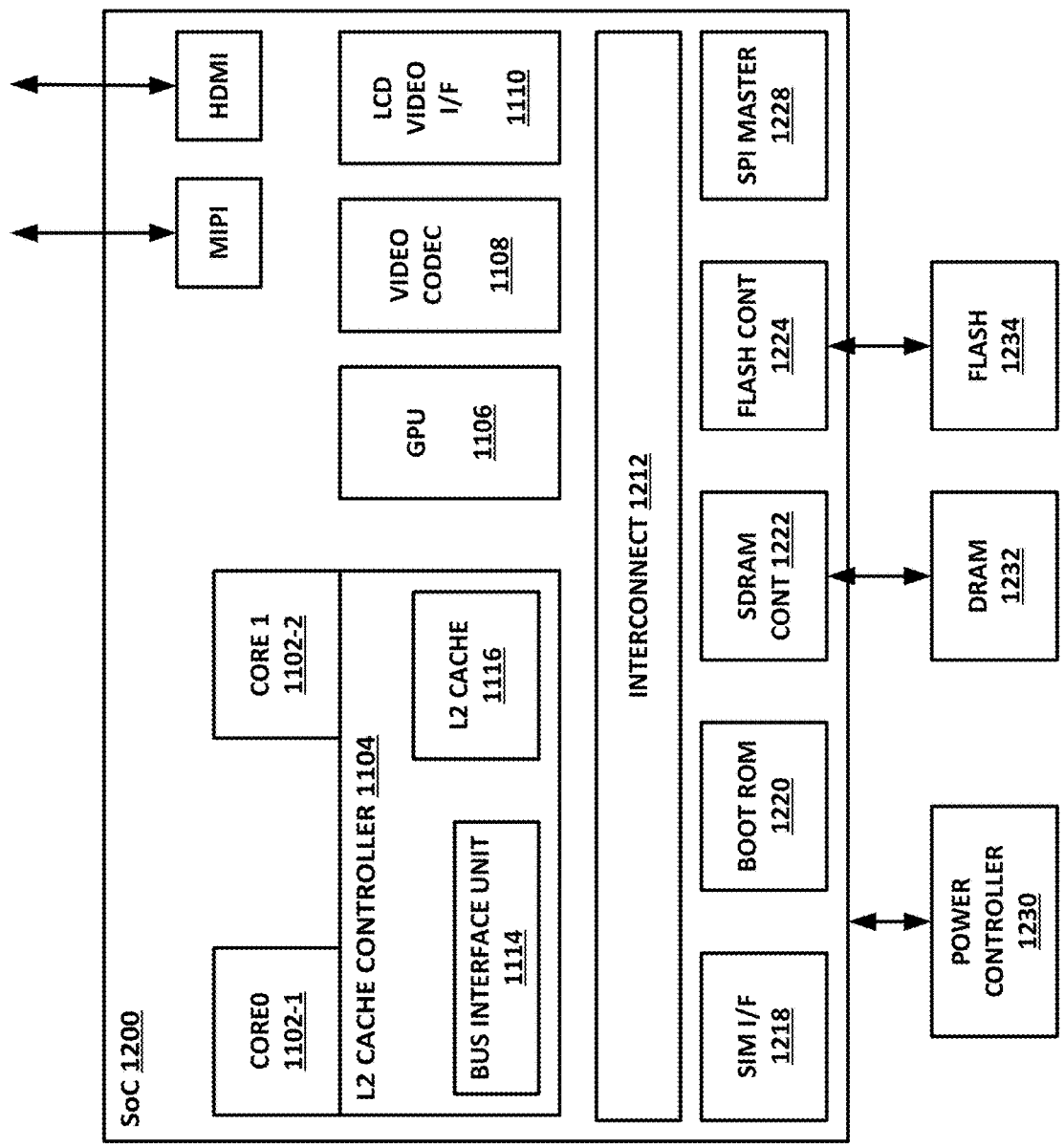
FIG. 12 is a block diagram of selected elements of a system-on-a-chip (SoC).

FIG. 12 is a block illustrating selected elements of an example SoC 1200. Embodiments of SoC 1200 may be configured or adapted for providing runtime detection of browser exploits via injected scripts, as disclosed in the present specification.

At least some of the teachings of the present specification may be embodied on an SoC 1200, or may be paired with an SoC 1200. SoC 1200 may include, or may be paired with, an advanced reduced instruction set computer machine (ARM) component. For example, SoC 1200 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 1200 could also be integrated into, for example, a personal computer, server, video processing components, laptop computer, notebook computer, netbook, or touch-enabled device.

As with hardware platform 1100 above, SoC 1200 may include multiple cores 1202a and 1202b. In this illustrative example, SoC 1200 also includes an L2 cache control 1204, a GPU 1206, a video codec 1208, a liquid crystal display (LCD) I/F 1210 and an interconnect 1212. L2 cache control 1204 can include a bus interface unit 1214, a L2 cache 1216. Liquid crystal display (LCD) I/F 1210 may be associated with mobile industry processor interface (MIPI)/HDMI links that couple to an LCD.

SoC 1200 may also include a subscriber identity module (SIM) I/F 1218, a boot ROM 1220, a synchronous dynamic random access memory (SDRAM) controller 1222, a flash controller 1224, a serial peripheral interface (SPI) master 1228, a suitable power control 1230, a dynamic RAM (DRAM) 1232, and flash 1234. In addition, one or more embodiments include one or more communication capabilities, interfaces, and features such as instances of Bluetooth™ 1236, a 3G modem 1238, a global positioning system (GPS) 1240, and an 802.11 Wi-Fi 1242.

Designers of integrated circuits such as SoC 1200 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

FIG. 13 is a block diagram illustrating selected elements of a processor 1300. Embodiments of processor 1300 may be configured or adapted for providing runtime detection of browser exploits via injected scripts, as disclosed in the present specification.

In various examples, and throughout this specification and the appended claims, a "processor" may include any combination of logic elements operable to execute instructions, whether loaded from memory, or implemented directly in hardware, including, by way of nonlimiting example, a microprocessor, microcontroller, CPU, advanced RISC (reduced instruction set computing) machine (ARM), digital signal processor (DSP), FPGA, GPU, programmable logic array, ASIC, or virtual machine processor. In certain architectures, a multi-core processor may be provided, having for example, 2, 4, 8, 12, 16, 24, 32, 64, or 128 cores. In some embodiments, one or more co-processors or accelerators (hardware or software) may also be provided for specialized or support functions. In general, processor 1300 may include any number of processing elements, which may be symmetrical or asymmetrical.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

Processor 1300 includes one or more processor cores 1302, including core 1302-1-1302-N. Cores 1302 may be, as appropriate, single-thread cores or multi-thread cores. In multithreaded cores, more than one hardware thread may be provided at a time, and the core may therefore provide more than one logical core per physical core. The cores may be configured to execute instruction code. Each processor 1300 may include at least one shared cache 1330, which may be treated logically as part of memory 1340. Caches 1330 may be filled according to known caching techniques, and may store instructions and/or data that may be used by one or more components of processor 1300.

Processor 1300 may include an integrated memory controller (MC) 1334, to communicate with memory 1340. Memory controller 1334 may include logic and circuitry to interface with memory 1340, and may also include a cache controller to handle filling and evicting instructions and data to and from cache 1330.

By way of example, each core 1302 may include front-end logic 1306, execution logic 1314, and backend logic 1318.

In the illustrated embodiment, front-end logic 1306 includes an instruction decoder or decoders 1308, register renaming logic 1310, and scheduling logic 1312. Decoder 1308 may decode instructions received. Register renaming logic 1310 may provide register renaming, for example to facilitate pipelining. Scheduling logic 1312 may schedule instruction execution, and may provide out-of-order (OOO) execution. Front-end logic 1306 may fetch incoming instructions, perform various processing (e.g., caching, decoding, branch predicting, etc.), and pass instructions to execution logic 1314.

Execution logic 1314 includes one or more execution units 1316-1-1316-N. Execution units 1316 may include hardware instructions and microcode to carry out the provided instructions.

Backend logic 1318 includes retirement logic 1320. Core 1302 may provide for speculative execution of instructions, branch prediction, and similar. Retirement logic 1320 may be configured to determine which predicted instructions were actually needed by the program flow.

Processor 1300 may also include a PtP controller 1332, which enables connection to an uncore, chipset, Northbridge, Southbridge, or bus, by way of example.

Figure 14:
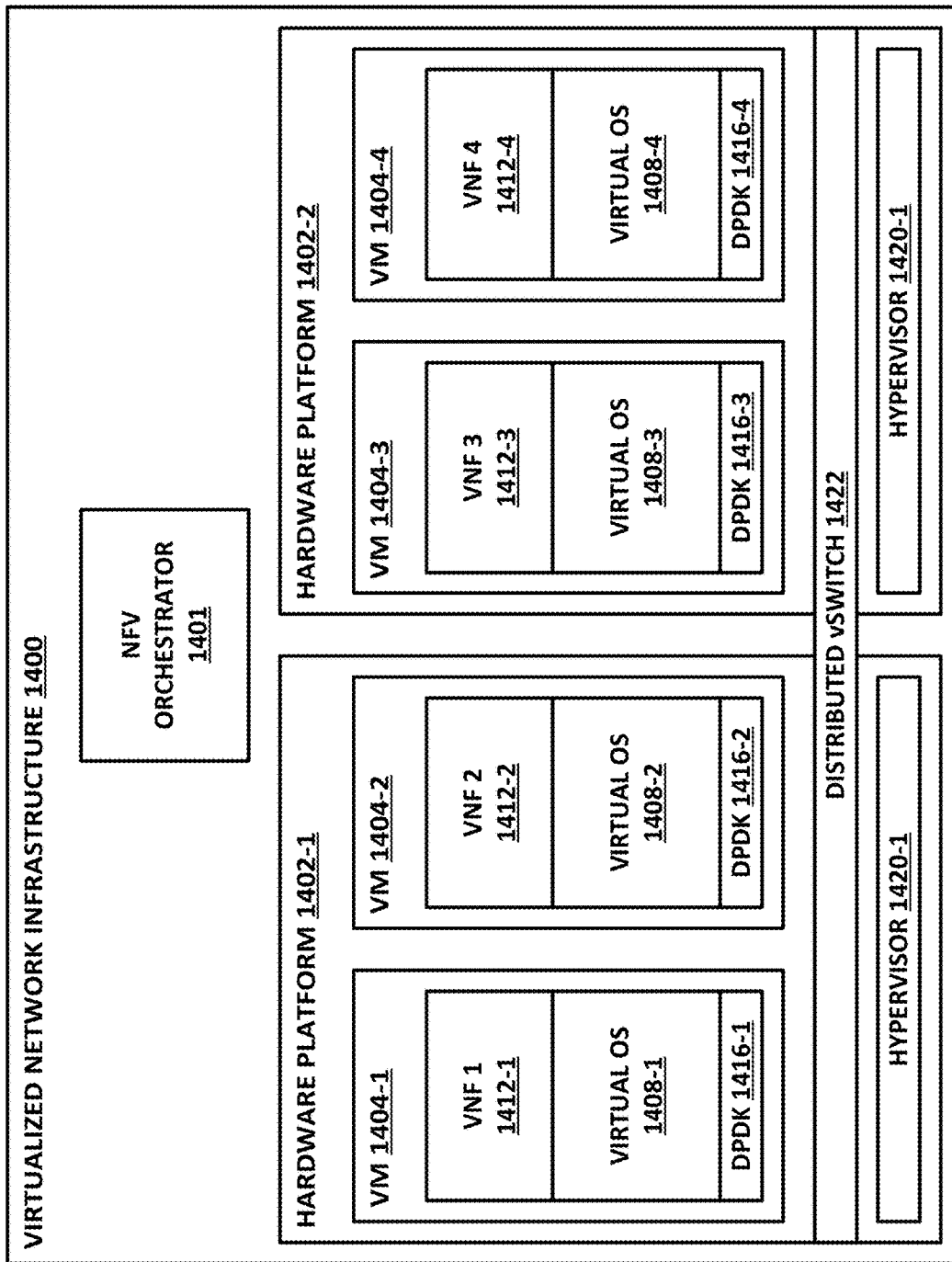
FIG. 14 is a block diagram of selected elements of a network function virtualization (NFV) infrastructure.

FIG. 14 is a block diagram of a network function virtualization (NFV) infrastructure 1400. Embodiments of NFV infrastructure 1400 may be configured or adapted for providing runtime detection of browser exploits via injected scripts, as disclosed in the present specification.

NFV is an aspect of network virtualization that is generally considered distinct from, but that can still interoperate with, a software defined network (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 400. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 14, an NFV orchestrator 1401 manages a number of the VNFs 1412 running on an NFVI 1400. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 1401 a valuable system resource. Note that NFV orchestrator 1401 may provide a browser-based or graphical configuration interface, and in some embodiments may be integrated with SDN orchestration functions.

Note that NFV orchestrator 1401 itself may be virtualized (rather than a special-purpose hardware appliance). NFV orchestrator 1401 may be integrated within an existing SDN system, wherein an operations support system (OSS) manages the SDN. This may interact with cloud resource management systems (e.g., OpenStack) to provide NFV orchestration. An NFVI 1400 may include the hardware, software, and other infrastructure to enable VNFs to run. This may include a hardware platform 1402 on which one or more VMs 1404 may run. For example, hardware platform 1402-1 in this example runs VMs 1404-1 and 1404-2. Hardware platform 1402-2 runs VMs 1404-3 and 1404-4. Each hardware platform may include a hypervisor 1420, virtual machine manager (VMM), or similar function, which may include and run on a native (bare metal) operating system, which may be minimal so as to consume very few resources.

Hardware platforms 1402 may be or comprise a rack or several racks of blade or slot servers (including, e.g., processors, memory, and storage), one or more data centers, other hardware resources distributed across one or more geographic locations, hardware switches, or network interfaces. An NFVI 1400 may also include the software architecture that enables hypervisors to run and be managed by NFV orchestrator 1401.

Running on NFVI 1400 are a number of VMs 1404, each of which in this example is a VNF providing a virtual service appliance. Each VM 1404 in this example includes an instance of the Data Plane Development Kit (DPDK), a virtual operating system 1408, and an application providing the VNF 1412.

Virtualized network functions could include, as nonlimiting and illustrative examples, firewalls, intrusion detection systems, load balancers, routers, session border controllers, DPI services, network address translation (NAT) modules, or call security association.

The illustration of FIG. 14 shows that a number of VNFs 1404 have been provisioned and exist within NFVI 1400. This FIGURE does not necessarily illustrate any relationship between the VNFs and the larger network, or the packet flows that NFVI 1400 may employ.

The illustrated DPDK instances 1416 provide a set of highly-optimized libraries for communicating across a virtual switch (vSwitch) 1422. Like VMs 1404, vSwitch 1422 is provisioned and allocated by a hypervisor 1420. The hypervisor uses a network interface to connect the hardware platform to the data center fabric (e.g., an HFI). This HFI may be shared by all VMs 1404 running on a hardware platform 1402. Thus, a vSwitch may be allocated to switch traffic between VMs 1404. The vSwitch may be a pure software vSwitch (e.g., a shared memory vSwitch), which may be optimized so that data are not moved between memory locations, but rather, the data may stay in one place, and pointers may be passed between VMs 1404 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 1422 is illustrated, wherein vSwitch 1422 is shared between two or more physical hardware platforms 1402.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may results in substitute arrangements, design choices, device possibilities, hardware configurations, software implementations, and equipment options.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the invention, as claimed, and the exclusion of certain elements from the FIGURES is not intended to imply that the element is to be excluded from the invention as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

Example Implementations

There is disclosed in one example, a computing apparatus, comprising: a processor and a memory; a web browser; and a web exploit mitigation engine, comprising instructions within the memory to instruct the processor to: insert a script into an incoming webpage, the script including instructions to hook application programming interface (API) function calls of a scripting language, the API function calls for a plurality of functions commonly used by browser exploits; observe information passed by a running script to the plurality of API functions; correlate the called API functions to a malware model; detect a web page making the API function calls as containing a browser exploit according to the correlating; and act on the detecting.

There is further disclosed an example computing apparatus, wherein the inserted script is written in the scripting language.

There is further disclosed an example computing apparatus, wherein the web exploit mitigation engine comprises a browser plugin to insert the script.

There is further disclosed an example computing apparatus, wherein the web exploit mitigation engine further comprises a whitelist, and wherein the instructions are further to not insert the script into pages received from websites listed on the whitelist.

There is further disclosed an example computing apparatus, further comprising a security agent resident on the computing apparatus and external to the web exploit mitigation engine, wherein the security agent includes instructions to provide support services to the web exploit mitigation engine.

There is further disclosed an example computing apparatus, wherein the web exploit detection engine is to assign individual scores to discrete behaviors.

There is further disclosed an example computing apparatus, wherein the web exploit detection engine is to compute a sum of individual scores, and to compare the sum to a threshold.

There is further disclosed an example computing apparatus, wherein the web exploit detection engine is to log the individual scores.

There is further disclosed an example computing apparatus, wherein the web exploit detection engine is further to compute a running sum of individual scores, and to detect the webpage when the running sum exceeds a threshold.

There is further disclosed an example computing apparatus, wherein the web exploit detection engine is further to correlate the called API functions to the malware during a memory layout preparation phase.

There is further disclosed an example computing apparatus, wherein the web exploit detection engine is further to block the running script after detecting the running script.

There is further disclosed an example computing apparatus, wherein the scripting language is JavaScript.

There is also disclosed an example of one or more tangible, non-transitory computer-readable media having stored thereon executable instructions to: receive an incoming webpage from a remote server; select the incoming webpage for verification; inject a monitoring script, written in a scripting language, at or near the top of the incoming webpage, the monitoring script comprising hooks into application programming interfaces (APIs) of the scripting language; observe individual calls to the hooked APIs by a script under analysis; assign to the individual calls individual scores, the individual scores representing a weighted probability that the individual calls are malicious activity;

compute a sum of individual scores; and if the sum of individual scores exceeds a threshold, detect the script under analysis as malicious.

There is further disclosed an example of one or more tangible, non-transitory computer-readable media, wherein injecting the monitoring script is performed via a browser extension.

There is further disclosed an example of one or more tangible, non-transitory computer-readable media, further comprising instructions to provision a security agent on a host hardware platform, and external to the browser extension, wherein the security agent is to provide support services to the browser extension.

There is further disclosed an example of one or more tangible, non-transitory computer-readable media, wherein the instructions are further to provision a whitelist, to not select the incoming webpage for monitoring if it appears on the whitelist.

There is further disclosed an example of one or more tangible, non-transitory computer-readable media, wherein the instructions are to assign the individual scores during a memory layout preparation phase.

There is further disclosed an example of one or more tangible, non-transitory computer-readable media, wherein the instructions are to log the individual scores.

There is further disclosed an example of one or more tangible, non-transitory computer-readable media, wherein the instructions are further to block the running script after detecting the running script.

There is further disclosed an example of one or more tangible, non-transitory computer-readable media, wherein the scripting language is JavaScript.

There is also disclosed an example computer-implemented method of remediating browser exploits via a browser extension, comprising: receiving an incoming webpage; selecting the incoming webpage for injection; injecting, via the browser extension, a monitoring script written in a scripting language, the monitoring script comprising hooks into application programming interfaces (API) calls of the scripting language, and injected so as to be executed before other scripts; monitoring access of the API calls by a script of the incoming webpage, including monitoring parameter data passed to the API calls; correlating the API calls to malware behavior; detecting the script of the incoming webpage as malicious or suspicious; and acting on the detecting.

There is further disclosed an example method, further comprising performing the correlating during a memory layout phase of the script of the incoming webpage.

There is further disclosed an example method, further comprising providing a security agent on a host hardware platform, and external to the browser extension, wherein the security agent is to provide support services to the browser extension.

There is further disclosed an example method, further comprising provisioning a whitelist, to not select the incoming webpage for monitoring if it appears on the whitelist.

There is further disclosed an example method, further comprising assigning individual scores to discrete behaviors.

There is further disclosed an example method, further comprising computing a sum of individual scores, and to compare the sum to a threshold.

There is further disclosed an example method, further comprising logging the individual scores.

There is further disclosed an example method, further comprising blocking the running script after detecting the running script.

There is further disclosed an example method, wherein the scripting language is JavaScript.

There is further disclosed an example apparatus comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus, as illustrated in a number of the above examples.

What is claimed is:

1. A computing apparatus, comprising:
a processor and a memory;
a web browser; and
a web exploit mitigation engine, comprising instructions within the memory to instruct the processor to:
insert a script into an incoming webpage, the script, including instructions to hook application programming interface (API) function calls of a scripting language, the API function calls for a plurality of API functions commonly used by browser exploits;
observe, within a running script of the incoming webpage, arguments passed to the plurality of API functions;
first, correlate the called API functions and arguments to a malware model, comprising assigning individual scores to calls to a plurality of API functions commonly used by browser exploits, and computing a sum of the individual scores;
second, correlate the called API functions to the malware model during a memory layout preparation phase;
based at least in part on the first and second correlating, detect the webpage as containing a browser exploit; and
block the running script.

2. The computing apparatus of claim 1, wherein the inserted script is written in the scripting language.

3. The computing apparatus of claim 1, wherein the web exploit mitigation engine comprises a browser plugin to insert the script.

4. The computing apparatus of claim 1, wherein the web exploit mitigation engine further comprises a whitelist, and wherein the instructions are further to not insert the script into pages received from websites listed on the whitelist.

5. The computing apparatus of claim 1, further comprising a security agent resident on the computing apparatus and external to the web exploit mitigation engine, wherein the security agent includes instructions to provide support services to the web exploit mitigation engine.

6. The computing apparatus of claim 1, wherein the web exploit detection engine is to log the individual scores.

7. The computing apparatus of claim 1, wherein the web exploit detection engine is further to compute a running sum of individual scores, and to detect the webpage when the running sum exceeds a threshold.

8. The computing apparatus of claim 1, wherein the scripting language is JavaScript.

9. One or more tangible, non-transitory computer-readable media having stored thereon executable instructions to:
receive an incoming webpage from a remote server;
select the incoming webpage for verification;
inject a monitoring script, written in a scripting language, at or near the top of the incoming webpage, the monitoring script comprising hooks into application programming interface (API) functions of the scripting language;
observe individual calls to the hooked APIs by a script under analysis, including correlating API function calls to a malware model during a memory layout preparation phase, and observing arguments passed to the API function calls when the API function calls are invoked;
based at least in part on the observation, assign to the individual calls individual scores, the individual scores representing a weighted probability that the individual calls are malicious activity;
compute a sum of individual scores; and
if the sum of individual scores exceeds a threshold, block the script under analysis.

10. The one or more tangible, non-transitory computer-readable media of claim 9, wherein injecting the monitoring script is performed via a browser extension.

11. The one or more tangible, non-transitory computer-readable media of claim 9, wherein the instructions are further to provision a whitelist, to not select the incoming webpage for monitoring if it appears on the whitelist.

12. The one or more tangible, non-transitory computer-readable media of claim 9, wherein the instructions are to assign the individual scores during a memory layout preparation phase.

13. The one or more tangible, non-transitory computer-readable media of claim 9, wherein the scripting language is JavaScript.

14. A computer-implemented method of remediating browser exploits via a browser extension, comprising:
receiving an incoming webpage;
selecting the incoming webpage for injection;
injecting, via the browser extension, a monitoring script written in a scripting language, the monitoring script comprising hooks into application programming interfaces (API) function calls of the scripting language, and injected so as to be executed before other scripts;
monitoring access of the API calls by a script of the incoming webpage, including correlating API function calls to a malware model during a memory layout preparation phase and monitoring parameter data passed to the API function calls when the API function calls are invoked;
correlating the API calls and parameter data to malware behavior, comprising observing calls to a set of API functions commonly used in malware, assigning individual scores to individual function calls, and summing the individual scores;
detecting the script of the incoming webpage as malicious or suspicious, comprising comparing the sum of the individual scores to a threshold; and
based at least in part on the detecting, block the script of the incoming webpage.

15. The method of claim 14, further comprising performing the correlating during a memory layout phase of the script of the incoming webpage.

16. The method of claim 14, wherein the scripting language is JavaScript.

17. The method of claim 14, wherein acting on the detecting comprises blocking the incoming webpage.

18. The method of claim 14, wherein detecting the script as malicious or suspicious comprises computing a running sum of individual scores, and detecting the script as malicious or suspicious when the running sum exceeds a threshold.

* * * * *